Dec. 2, 1952 L. LARSON ET AL 2,619,938
FLUID PRESSURE ACTUATED MOTOR
Filed Aug. 8, 1949 7 Sheets-Sheet 1

INVENTORS.
LEONARD LARSON,
BYRON T. BERGE,
BY Knight + Rodgers
ATTORNEYS.

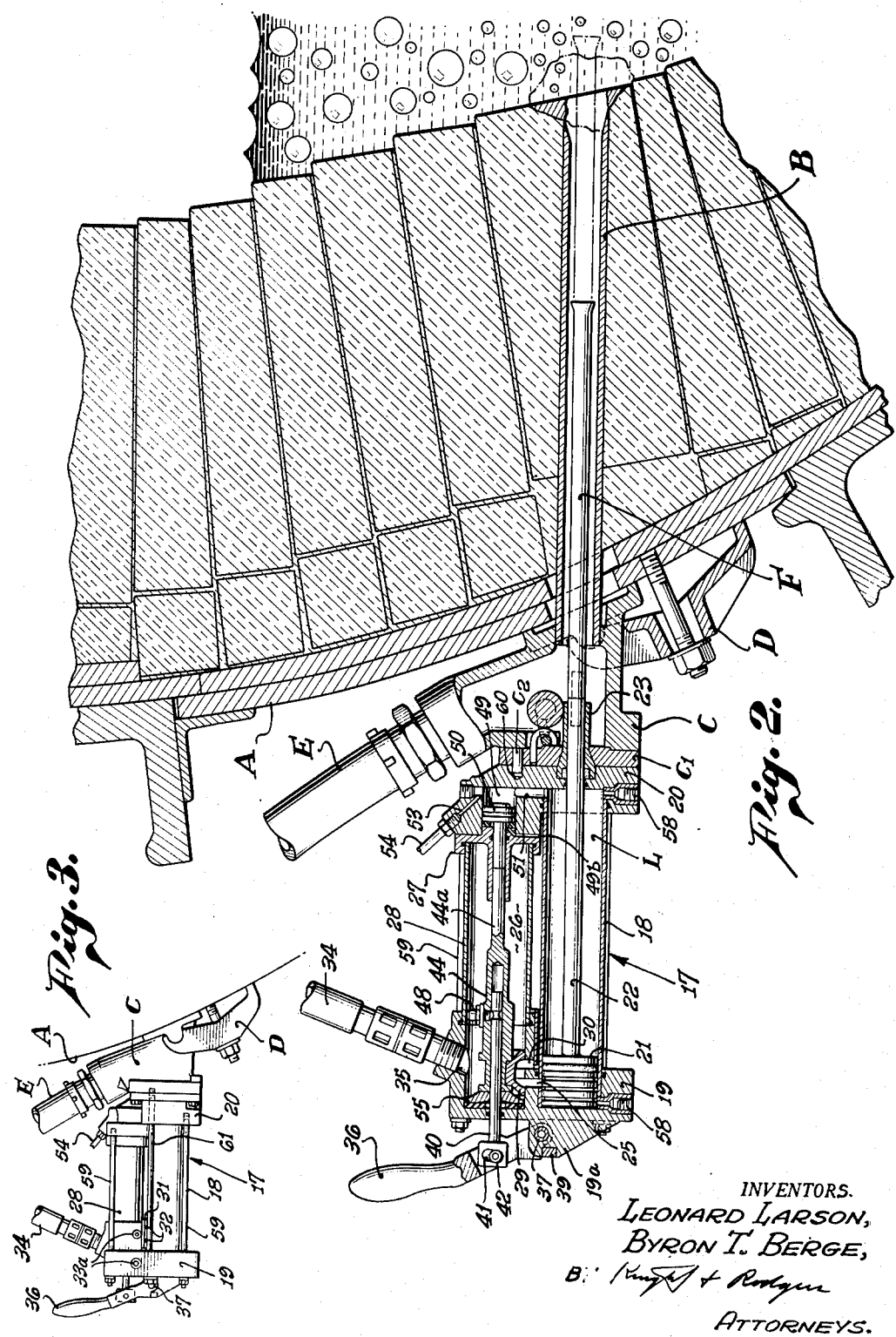

Dec. 2, 1952 — L. LARSON ET AL — 2,619,938
FLUID PRESSURE ACTUATED MOTOR
Filed Aug. 8, 1949 — 7 Sheets-Sheet 3

INVENTORS.
LEONARD LARSON,
BYRON T. BERGE,
BY Knight + Rodgers
ATTORNEYS.

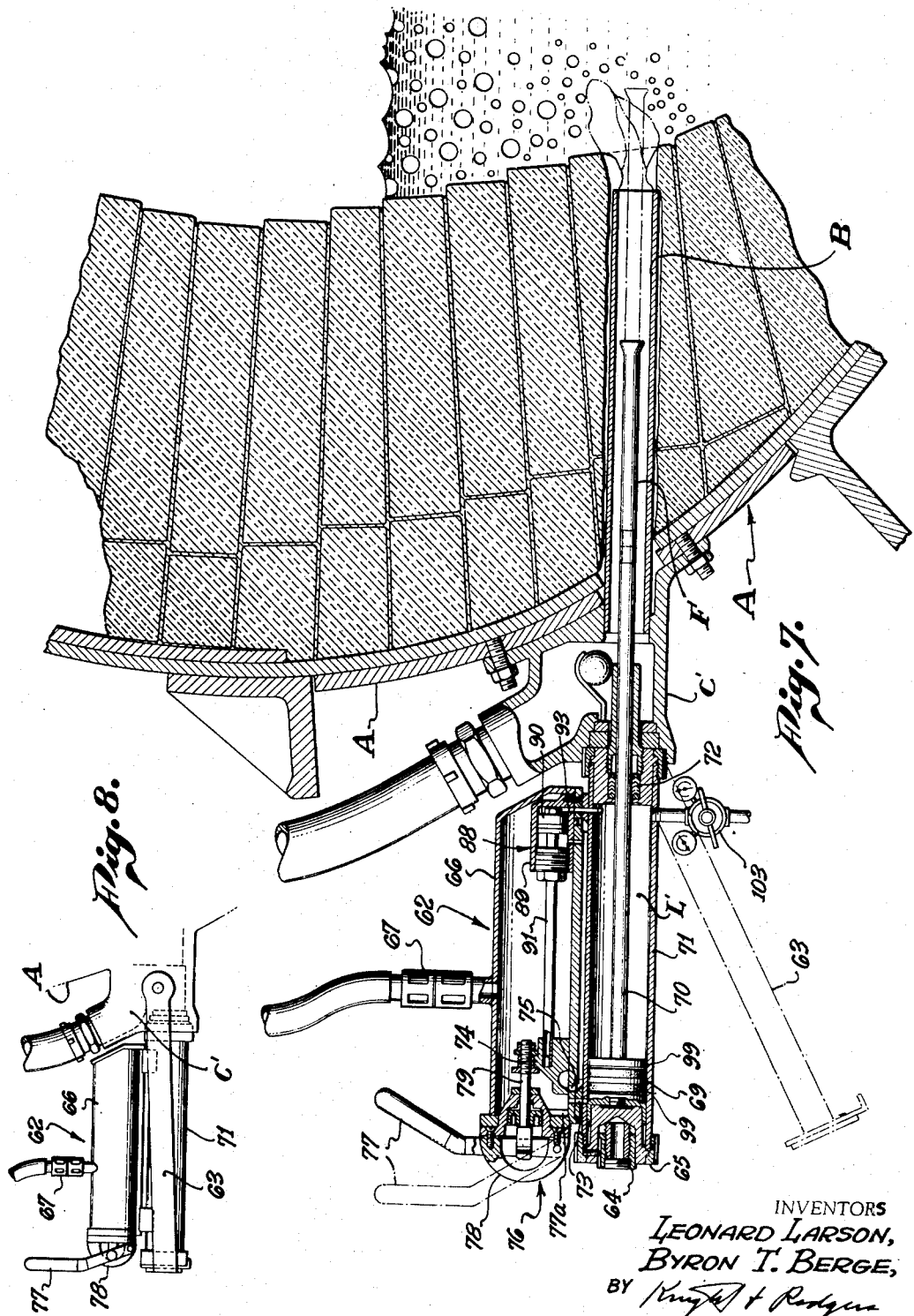

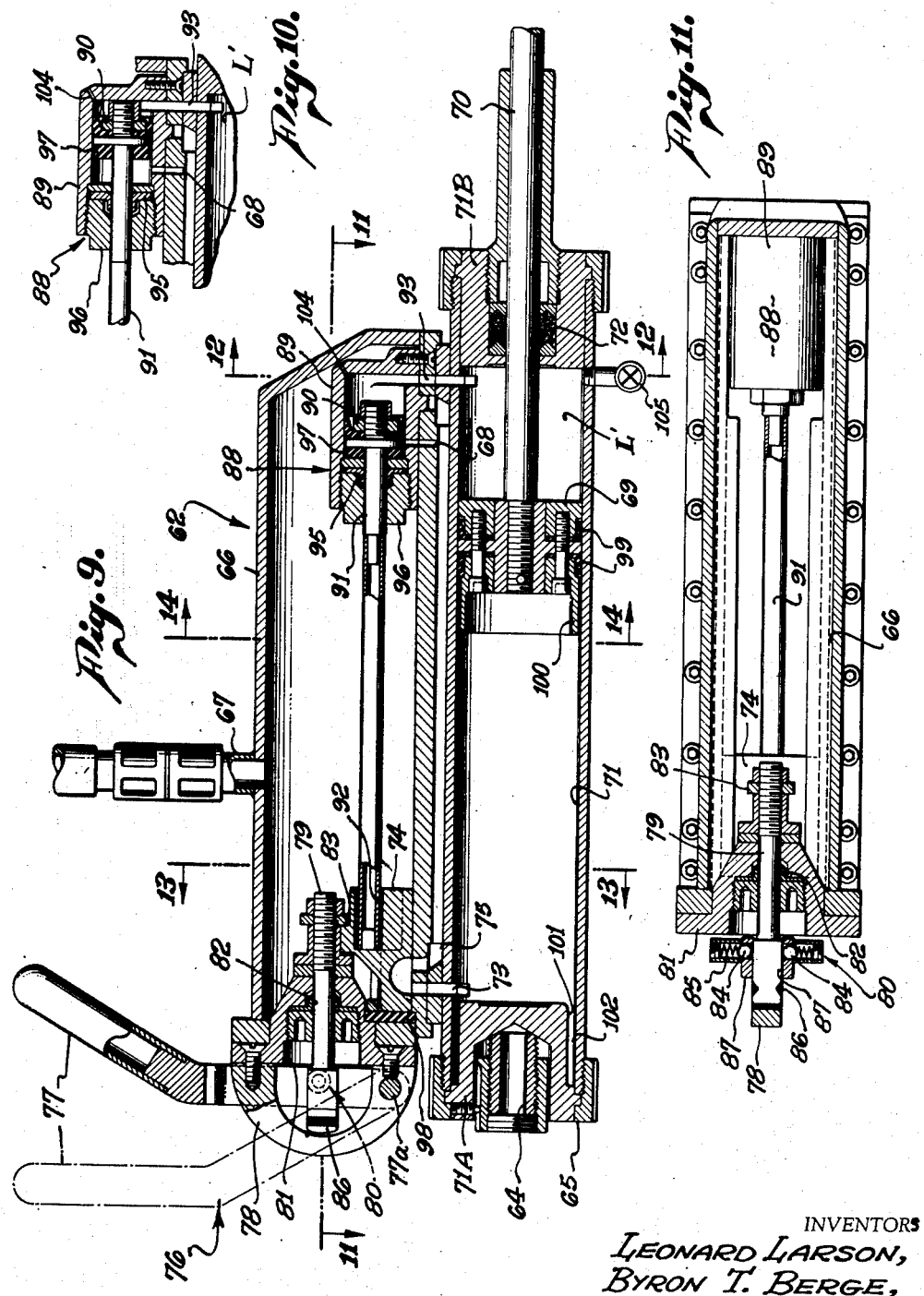

Dec. 2, 1952    L. LARSON ET AL    2,619,938
FLUID PRESSURE ACTUATED MOTOR
Filed Aug. 8, 1949    7 Sheets-Sheet 6
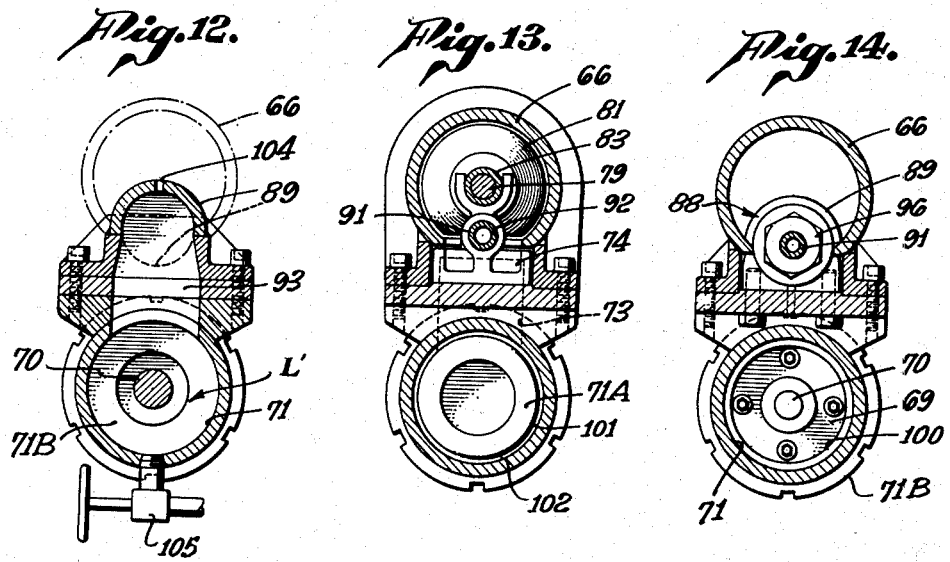
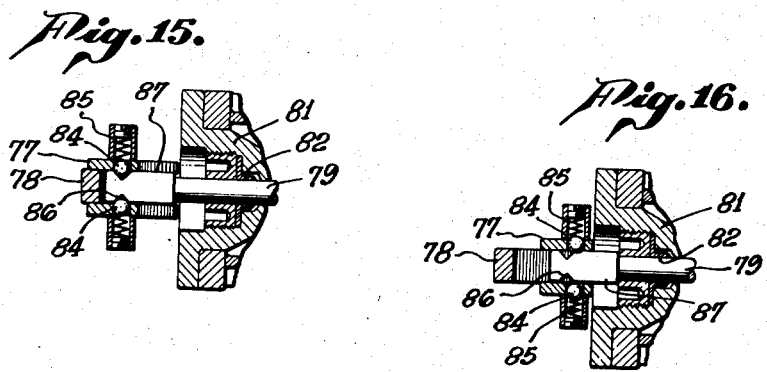
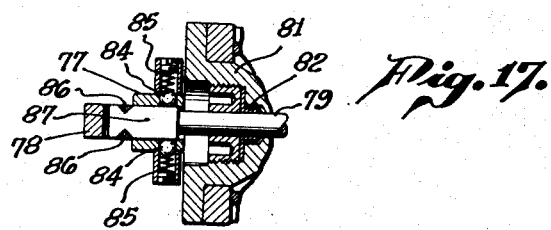
INVENTORS
LEONARD LARSON,
BYRON T. BERGE,
BY
ATTORNEYS Dec. 2, 1952
L. LARSON ET AL
2,619,938
FLUID PRESSURE ACTUATED MOTOR
Filed Aug. 8, 1949
7 Sheets-Sheet 7
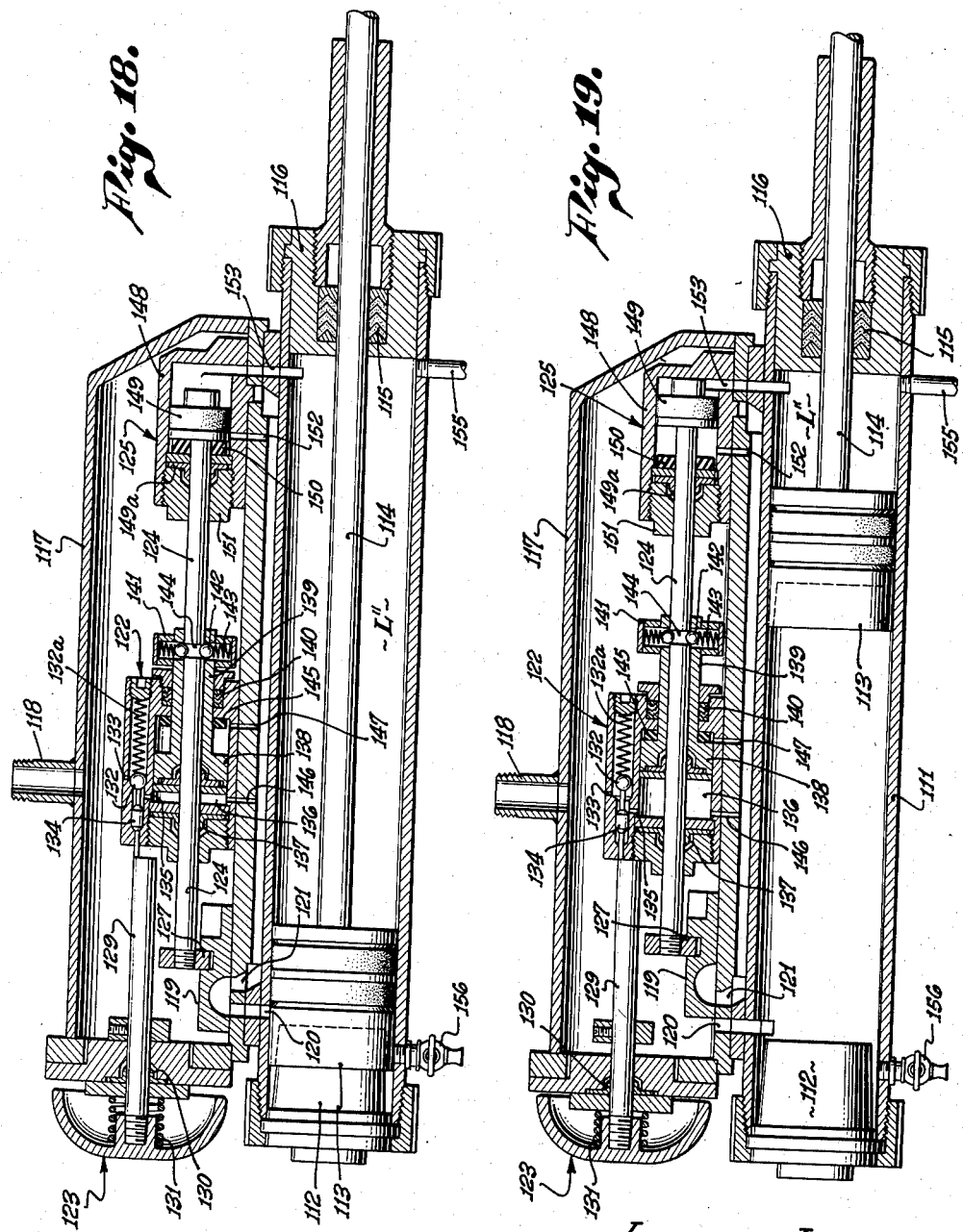
LEONARD LARSON,
BYRON T. BERGE,
INVENTORS.
BY
ATTORNEYS.

Patented Dec. 2, 1952

2,619,938

UNITED STATES PATENT OFFICE 2,619,938

FLUID PRESSURE ACTUATED MOTOR

Leonard Larson and Byron T. Berge, McGill, Nev., assignors to Kennecott Copper Corporation, New York, N. Y., a corporation of New York Application August 8, 1949, Serial No. 109,084

4 Claims. (Cl. 121—38)

This invention relates to motors of the fluid pressure actuated type and to both process and apparatus aspects of the same. More particularly it has to do with motors and devices of the described type adapted to effect a rapid single-cycle operation, such as the reciprocation of an actuated member. Movement of the member in one direction may be manually or otherwise induced, but the return stroke may be, and preferably is, effected automatically in a novel manner entirely independent of control by the operator.

This application is in part a continuation of our copending application Ser. No. 693,231, filed August 27, 1946, entitled "Fluid Operated Actuator," which is now abandoned.

One use to which this invention is particularly adapted is in the operation of so-called "mechanical" punching apparatus such as that employed for the purpose of cleaning the discharge openings of copper converter tuyères, examples of which are described and claimed in our U. S. Patent No. 2,432,996 issued December 23, 1947, but the utility of motors and apparatus of this invention in other roles where a rapid single-cycle reciprocatory motion is required, as in material sampling devices and the like, will be apparent to those skilled in the art. As a specific example of the application of the invention to a useful purpose, the ensuing description concerns converter punching use, but it will be appreciated that such disclosure is by way of illustration and not limitation.

Where a rapid single-cycle operation of a reciprocable member is desired, as in converter tuyère punching, considerable difficulty has been encountered in effecting a rapid action under circumstances which establish a smooth reversal of the forward motion, in the absence of damage to the apparatus. Furthermore, it is frequently desirable to cause this single-cycle reciprocation to be quite closely duplicated in successive cycles of operation. We are acquainted with the fact that numerous proposals have heretofore been made in connection with fluid motors to utilize a pneumatic or other compressible fluid cushion at the end of the forward stroke, to decelerate the reciprocable member at a high rate while preventing detrimental contact of the reciprocable member with a fixed member of the structure, and structures of this type have been disclosed in our above mentioned Patent No. 2,432,996.

It is an important object of this invention to provide a fluid pressure actuated motor or device of the character described and a method of operating such a motor or device, in which the operating force for the forward or working stroke is obtained by direct supply of fluid pressure to the rearward side of a reciprocable piston, and the operating force for the return stroke is obtained from fluid pressure built up or stored up at the forward side of the piston as a result of the forward movement of the latter, wherein a high efficiency of utilization of this stored energy is obtained.

A further object of this invention is to provide for utilizing a pneumatic or other compressible fluid cushion for effecting stroke reversal and return of the reciprocable member to starting position, for the dual purpose of decelerating and reversing the travel of the reciprocating parts and for controlling the supply and discharge of the motive fluid to the device, whereby both rapid high rate reversal and a high degree of fidelity of repetition are attained.

A further object of the invention is to provide a device of the character described, in which the operation of the device is instituted by manual control, and in which completion of the cycle of operation is carried out entirely independent of the operator under response to conditions obtaining in the device itself.

A further object of the invention, according to certain embodiments, is to provide an apparatus in which the operator directly causes supply of motive fluid to produce the forward or working stroke, and in which the reversal or return stroke is effected by the apparatus in an automatic manner in response to pressure conditions developed as a result of the forward movement.

Another object of the invention, according to another embodiment, is to provide an apparatus of the character described, in which the operator causes initiation of the reciprocation cycle, but in which the supply of motive fluid for the forward stroke and the reversal and subsequent rearward stroke are controlled in an automatic manner, wherefore the rate of travel in each direction, as well as the character of the stroke-reversal, is removed from control of the operator and consistent repetition of the operating cycle is ensured.

A further object is to provide means for conveniently modifying or adjusting the operating characteristics of the motor to suit the work to be performed.

A further object is to provide a cylinder type fluid pressure operated device provided with a reciprocable piston member adapted for forward and rearward motion, in which supply of motive fluid is provided at one side of the piston only, for movement thereof in the forward direction, and the reversal and return stroke is provided by stored energy built up at the other side of the piston, and in which means are preferably provided to supply a compressible fluid in restricted amount to such other side so that sufficient residual pressure is always had to cause the piston to complete its return or rearward stroke and to retain the piston there in readiness for its next forward or working stroke.

The motor or actuator device may comprise essentially a cylinder member provided with forward and rearward ends, the cylinder being preferably closed at the rearward end, a piston member slidably mounted in said cylinder and having a piston rod extending through the forward end of the cylinder in fluid-tight sealing engagement therewith, valved fluid pressure supply means adapted alternatively to supply motive fluid to the rearward end of the cylinder or to connect said rearward end to exhaust, means for moving the valve means to furnish such supply, and pressure responsive means in fluid communication with the forward end of the cylinder adapted to move the valve means to connect the rearward end of the cylinder to exhaust when a given superatmospheric pressure has been built up at such forward end as a result of movement of the piston toward that end under the influence of the applied motive fluid pressure, whereby the superatmospheric pressure thus built up forwardly of the piston is utilized not only to effect such movement of the valve means from pressure supply to exhaust position but also to effect a very rapid return movement of the piston.

The above and other objects of the invention will be brought out in the ensuing description of two illustrative embodiments thereof, or will be apparent from such description. These embodiments are illustrated in the accompanying figures of drawings, in which:

Fig. 2 is a similar longitudinal sectional view on a smaller scale showing certain parts in different positions, the device being mounted on a converter for the operation of a punch rod;

Fig. 3 is a side elevation on a still smaller scale showing the exterior appearance of the actuator device as applied to a converter;

Figure 1:
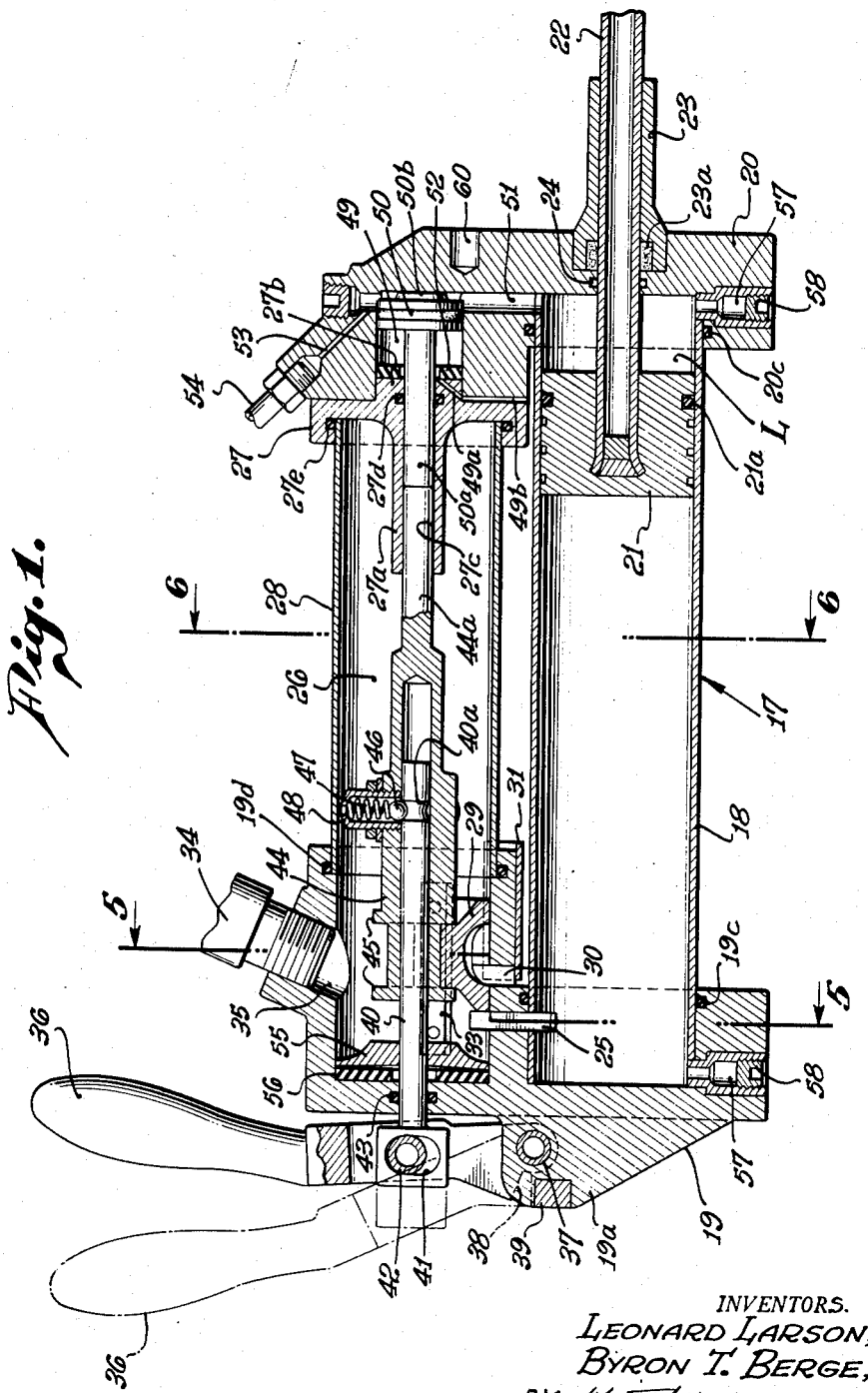
Fig. 1 is a longitudinal sectional view of a fluid pressure motor or actuator device according to this invention.
Figure 5:
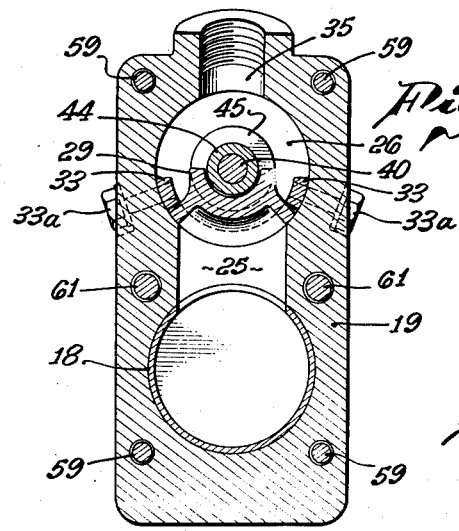
Figure 6:
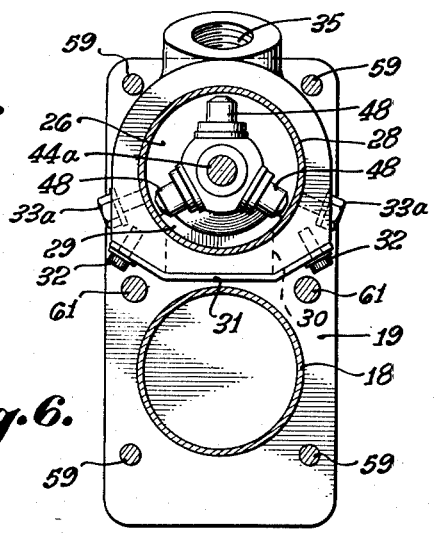
Figure 6A:
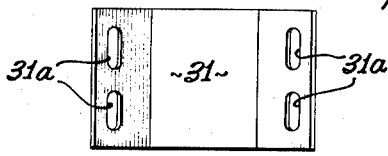

Figs. 5 and 6 are transverse sectional views substantially on the lines 5—5 and 6—6 respectively of Fig. 1;

Fig. 6a is a plan view of the baffle plate shown in Fig. 6;

Fig. 7 is a longitudinal section of another form of actuator device according to this invention, established for the operation of a punch-rod on a converter;

Fig. 8 is a side elevation of the actuator device of Fig. 7 on smaller scale, showing the exterior appearance of the same as applied to a converter;

Fig. 9 is a longitudinal section, on larger scale than Fig. 7, showing the device in an intermediate operative position, and also showing an alternative means of supplying air at low pressure to the forward end of the cylinder;

Fig. 10 is a detail of the valve return means illustrated at the right hand end of the valve chest in the form shown in Fig. 9, with the parts in a different operative position;

Fig. 11 is a horizontal section as taken on line 11—11 in Fig. 9;

Figs. 12, 13 and 14 are transverse sectional views as taken on lines 12—12, 13—13 and 14—14, respectively, in Fig. 9;

Figs. 15, 16 and 17 are fragmentary details as taken at the extreme left-hand end of Fig. 9, on a level corresponding to the section line 11—11, showing the operating control parts in various operative positions encountered in use; and Figs. 18 and 19 are views corresponding to Fig. 1, showing another modified form of device according to this invention, in two different operative positions.

Referring to the embodiment of the invention shown in Figs. 1–6, the fluid pressure actuated motor or device 17 comprises a motor cylinder 18 suitably mounted in rear and front heads 19 and 20, in which reciprocates a piston 21 having a piston rod 22 attached thereto and projecting beyond the cylinder and slidably received in suitably aligned bores in front head 20 and sleeve or gland 23. A fluid tight packing 24 preferably of the O-ring type seals the forward end of cylinder 18 thereby to trap at all times a body of compressible fluid in the forward end of cylinder 18. Adequate lubrication for piston rod 22 is provided by oiled felt packing 23a in gland 23, which may be supplied with lubricant from time to time by a Zerk connection (not shown).

Adjacent the rear end of cylinder 18 is a fluid passage such as port 25 in head 19 for the admission of motive fluid to the cylinder behind piston 21 and for the release of fluid from that end of the cylinder. Passage or port 25 communicates with a pressure chest 26, defined by head 19, retainer member 27 on front head 20, and upper cylinder 28 mounted between head 19 and member 27 and in substantial parallelism with cylinder 18. A slide valve 29 controls port 25, opening it to the pressure chest 26 when in its first or forward position shown in Fig. 1 for the power or working stroke of piston 21, and connecting port 25 to atmospheric exhaust passage or port 30 in head 19 when valve 29 is in its second or rearward position (Fig. 2) to vent or release the pressure fluid for the return stroke of piston 21 under the pressure built up by it in the trapped body of fluid in the forward end of cylinder 18. A baffle plate 31, shown in end elevation in Fig. 6 and in plan in Fig. 6a, engages head 19 adjacent exhaust passage or port 30 as shown in Figs. 1–3 inclusive. It is adjustably secured in place by bolts 32 extending through slots 31a therefor so as to partly restrict vent port 30 for a purpose which will be described later. Guides or keepers 33 (Figs. 1 and 5) secured by bolts 33a extending through head 19 hold valve 29 against rotative movement within valve chest 26 which is supplied with compressed air or other motive fluid under suitable pressure by line 34 and port 35 in head 19.

Valve 29 is arranged for manual operation by a handle 36 having a bifurcated portion engaging opposite sides of a rearwardly extending integral rib 19a on cylinder head 19 and pivoted to the latter at 37 for movement between the broken line and full line positions shown in Fig. 1. In its rearward or normal rest position (shown in Figs. 2 and 3 and in broken lines in Fig. 1) shoulders 38 on the bifurcations of handle 36 engage a stop block 39 on rib 19a of cylinder head 19. A valve operating rod 40 extending within valve chest 26 for reciprocatory movement axially thereof has a vertically extending outer end portion received between the bifurcations of handle 36 and has a slot 41 through which extends a pin 42 secured to said bifurcations. A packing such as an O-ring seal 43 prevents leakage of fluid out of pressure chest 26 around rod 40. Rod 40 extends within a sleeve member 44, which is yoked to valve 29 by the provision of flanges 45 engaging opposite ends of the valve and has an axial extension 44a loosely received and slidably guided in a cooperative bore 27c in extension 27a on retainer member 27. Disengageable clutch means are provided between rod 40 and member 44 comprising a plurality of ball members 46 having radially disposed biasing springs 47 in housing 48 on member 44, the ball members engaging a groove 40a in rod 40 but riding up out of said groove and on the outer surface of said rod when the clutch disengages.

While the described arrangement permits valve 29 to be actuated by forward movement of handle 36, shown in full lines in Fig 1, to admit motive fluid to the rear end of cylinder 18 to drive piston 21 on its forward or working stroke, and to be actuated by rearward movement of said handle to the position shown in Fig. 2 to release the pressure back of piston 21 for the return stroke of the latter under pressure built up in the trapped body of fluid forward of the piston, exact timing to attain a full forward stroke and rapid reversal of the piston is difficult to gauge and it is preferable to arrange to shift valve 29 rearwardly to its exhaust or pressure-releasing position (Fig. 2) automatically in response to pressure conditions in the forward end of cylinder 18. To accomplish this front head 20 is formed with a bore 49 axially aligned with pressure chest 26. An extension 27b on member 27 projects within the rearward end of bore 49. Within the chamber or cylinder formed by bore 49 a piston 50 is reciprocably mounted, having a stem 50a of reduced diameter slidably received in axial bore 27c of member 27 so as to abut the extreme forward end of extension 44a on member 44 when the parts are in the positions shown in Figs. 1 and 2. A passage 51 in cylinder head 20 connects the front end of cylinder 18 with the front end of bore 49 so that piston 50 is subjected to pressure conditions in the trapped body of fluid in the space L in front of piston 21. The forward end portion 50b of piston 50 is of reduced diameter, so as to provide free access of pressure communicated through passage 51 to the forward end of said piston.

When high pressure is built up by piston 21 toward the end of its forward or working stroke, as when it reaches a position somewhat beyond that shown in Fig. 1, this pressure communicated from space L to piston head 50 by passage 51 will snap piston 50 rearwardly until it contacts resilient bumper 52 at the rear end of bore 49 and the valve parts will be automatically shifted to the positions shown in Fig. 2. If there is frictional or other resistance to such movement by actuating rod 40 or handle 36, ball members 46 of the disengageable clutch means will merely be forced out of groove 40a and member 44 will be pushed rearwardly relative to rod 40 and valve 29 will assume its rearward position to exhaust pressure fluid from behind piston 21. However, in the usual operation of the motor handle 36 is shoved forward, or to the right in Fig. 2, as far as it will go, i. e. until it actually contacts head 19. Handle 36 will then be beyond or to the right of its full line position in Fig. 2 and the clutch means will have been already disengaged when piston 50 is forced rearwardly by the built up pressure in space L.

In order to maintain the body of fluid which is trapped in front of working piston 21 at proper volume and pressure to insure full movement of the piston on its return stroke and to take care of any loss through seepage past the packing ring 21a on piston 21, air or other compressible fluid in small volume and at low pressure may be fed to the forward end of bore 49 through a restricted passage 53 from supply line 54. A low superatmospheric pressure of, say, 5 to 7 lbs. per square inch is maintained in line 54. This insures an adequate body of compressible fluid at all times in space L forwardly of piston 21 as well as full return of the piston on its back stroke as indicated in Fig. 2.

By positioning port 25 in spaced relation to the extreme rear end of cylinder 18 a cushion pocket is provided to prevent piston 21 from striking head 19 forcibly on its rapid back stroke. The fluid trapped in the cushion chamber escapes slowly to port 25 permitting gradual or slow movement of the piston during the final inch or so of travel to its extreme rearward position (Fig. 2). Since packing ring 21a on piston 21 is then forward of passage 25 motive fluid admitted from pressure chest 26 (on forward movement of valve 29, Fig. 1) gets behind piston 21 to initiate its forward or work stroke.

When balls 46 of the clutch mechanism are disengaged from groove 40a as described above it is only necessary to move handle 36 from its forward to its rearward position to cause the clutch mechanism to reengage. Movement of member 44 rearwardly in pressure chest 26 will be stopped by striking plate 55 backed by a washer 56 of suitable resilient material. To permit quick rearward movement of piston 50 when the builtup pressure in the trapped body of fluid reaches a predetermined value the chamber in bore 49 rearwardly of piston head 50 is vented to atmosphere by passages or ports 49a and 49b in extension 27b and cylinder head 20. A packing such as an O-ring seal 27d prevents leakage of fluid out of pressure chest 26 around stem 50a of piston 50.

The opposite ends of cylinder 18 may be provided with sludge traps 57 closed by screw plugs 58. The motor or device may be held in assembled relation in any suitable manner as by a plurality of suitably secured tie rods 59 between cylinder heads 19 and 20. Packing such as O-ring seals are provided on cylinder heads 19 and 20 at 19c and 20c to seal the ends of the cylinder 18. Similar packings for the ends of upper cylinder 28 are provided at 19d on cylinder head 19 and at 27e in retainer member 27.

Figure 4:
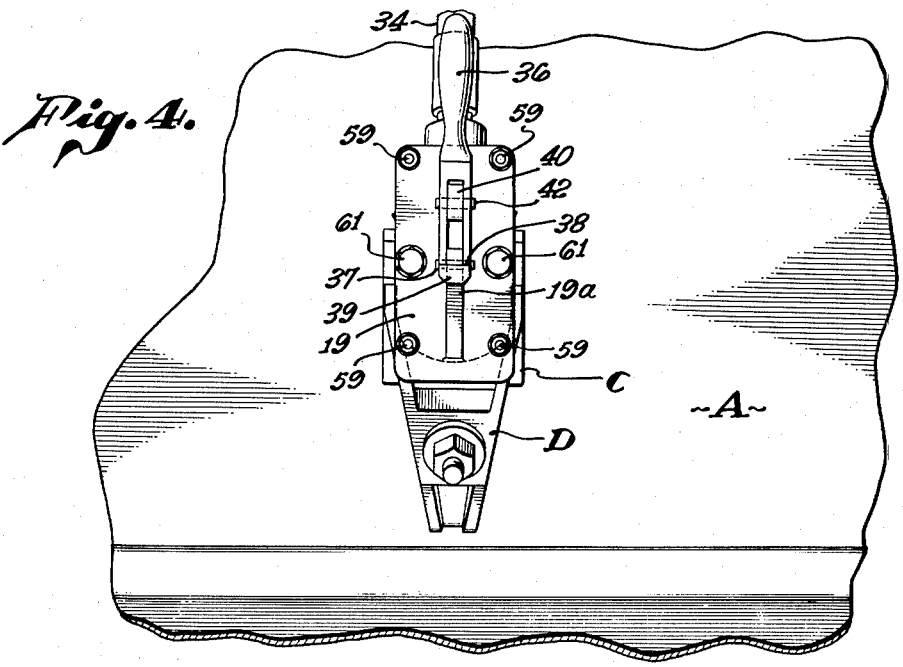
Fig. 4 is an end elevational view of the parts shown in either Fig. 2 or Fig. 3 and on a larger scale than in either of said figures.

Figs. 2, 3 and 4 show the motor or device in use as a fluid pressure operated actuator in conjunction with a "puncher," for the purpose of maintaining the tuyère passages of a copper converter open for the continued supply of blowing air. A indicates the outer wall of the converter, B a tuyère tube therein, and C an adapter, held to the converter wall A by a clamp D and arranged to blow air into the tuyère from a supply pipe E. The front cylinder head 20 of the motor device 17 engages the face plate $C_1$ of the adapter C, and sleeve 23 and piston rod 22 extend through an opening in plate $C_1$ axially aligned with tuyère B. A puncher rod F is removably attached to the projecting forward end of piston rod 22 to be reciprocated by the latter to clear the inner end of the tuyère B of incrustations as indicated. A recess 60 in front cylinder head 20 receives a dowel pin C2 projecting from face plate C1 and the motor device is securely held in place by two long tie bolts 61 extending through cylinder heads 19 and 20 and into threaded sockets therefor in adapter C.

Referring now more particularly to the operation of the above described fluid pressure motor or actuator, it should be noted that plate 31 which is adjustably mounted with reference to exhaust passage 30 has an important function in that it provides a convenient means for controlling and regulating the return movement of working piston 21. By setting plate 31 so as to restrict exhaust port 30 to a greater or less extent the escape of pressure fluid behind piston 21 is controlled and the speed and force of its return or back stroke movement caused by the pressure built up in space L can be modified and adjusted for smoothness of operation and best efficiency under the existing conditions of operation. Restricting exhaust port 30 reduces the speed and violence of the back stroke of piston 21 by slowing the venting of pressure fluid behind piston 21 while opening port 30 has the opposite effect. Once plate 31 has been set it need not be changed unless operating conditions, such as live pressure of motive fluid, effective stroke of working piston, nature of work to be performed, etc., undergo a change.

While the previous paragraph has reference to control of this back stroke of piston 21 by adjustable restriction of vent passage 30, control of the forward or working stroke is also possible by variation in the extent of opening of passage or port 25 when valve 29 is moved to its first or forward position (Fig. 1), thereby affecting the rate of supply of motive fluid and thus determining the forward velocity of piston 21 on its working stroke. As shown in Fig. 1, forward movement of valve 29 is limited by engagement of extension 44a on member 44 with stem 50a when piston 50 is at the forward end of bore 49. Passage 25 is shown fully opened or uncovered by valve 29. The extent of opening of passage 25 may be decreased by making 44a or 50a longer or by inserting one or more spacers between them. In that case (and even in the arrangement shown) forward thrust on handle 36, after movement of valve 29 is arrested by piston 50 striking the end of bore 29, will disengage clutch balls 46 and permit rod 40 to continue moving within member 44 until handle 36 hits cylinder 19 so that the clutch may be disengaged prior to rearward movement of piston 50, as previously described. When the distance between valve 29 and piston 50 is increased by spacers or otherwise in order to decrease the pressure supply opening of passage 25 by valve 29 as described above, the extent of the rearward movement of piston 50 wil be correspondingly reduced, such movement being limited by engagement of member 44 with striking plate 55. In that case piston 55 would not engage bumper 52 unless the latter is made thicker than shown in Figs. 1 and 2.

After piston 50 has been forced rearwardly by the built up pressure in space L to move valve 29 to its rearward or second position (Fig. 2), rearward movement of working piston 21 by the same built-up pressure causes such pressure to decrease in space L. When it has decreased to the relatively low value maintained by low pressure supply line 54, the high air chest pressure from chamber 26 against the rearward end of stem 50a will move piston 50 to its forward position (Fig. 1) where it will stay until again moved rearwardly by the high pressure built up by piston 21 in space L on its next forward or working stroke. Valve 29 is retained in each of its operative positions (Figs. 1 and 2) by radial pressure thereon imposed by the pressure fluid in pressure chest 26 which presses the outer surface of the valve against the wall of the chest.

Figs. 7 to 17 inclusive show another form of fluid pressure operated motor or actuator device according to this invention for use on a copper converter in the role of a "puncher" for the purpose of maintaining the tuyère passages open for continued supply of blowing air, the motor being indicated at 62 and mounted on the side wall A of a converter through the agency of an adapter housing C' and a bail 63 adapted to be engaged by a jack screw 64 at the rearward end 65 of the puncher. The motor or actuator device is provided with an air chest or valve chamber 66 having an air pressure supply line 67, and carries a puncher rod F which is adapted to be disposed within the tuyère B. The puncher rod F is adapted to be actuated through the agency of a piston 69 carried on a piston rod 70 engaging the puncher rod F in any suitable manner, and slidably mounted in a motor cylinder 71 having rear and forward cylinder heads 71A and 71B respectively. The forward head 71B of the cylinder is provided with a stuffing box 72 adapted to engage the piston rod 70 in fluid-tight sealing engagement.

A fluid passage or port 73 is provided adjacent the rearward end of the cylinder 71, and a valve member 74 is provided within the air chest 66 in position to expose the passage 73 to communication with the air chest, or to place such passage in communication with a discharge or exhaust passage 75. Means are provided for effecting manual operation of the valve to a position such as to supply motive fluid to the interior of the cylinder 71 rearwardly of the piston 69, such means being indicated generally by the reference numeral 76 and comprising an operating handle 77 of bifurcated form pivotally mounted as at 77a to a guide member 78 mounted on the air chest 66, a valve operating rod 79 connected to the valve 74, together with disengageable clutch means 80 disposed between the handle 77 and the valve rod 79, as shown in Fig. 9. The valve rod 79 preferably extends through a head member 81 at the rearward end of the valve chest 66, a stuffing box 82 being provided to prevent loss of air from the air chest. The attachment of the rod 79 to the valve 74 may be had through the agency of a rather loose fitting yoke connection 83, illustrated in sectional view in Fig. 9 and in transverse view in Fig. 13.

The disengageable clutch means 80 may comprise a plurality of ball members 84 provided with biasing springs 85 and adapted to engage detents or notches 86 on the valve operating rod 79, or to ride up out of the notches 86 onto a flat portion 87 on said rod, depending upon the operative position of the clutch means. The function of the clutch means in operation of the device is illustrated more particularly in Figs. 15, 16 and 17, Fig. 15 representing the starting position in which the handle 77 would be located, corresponding to the dot-dash position in Fig. 9, at the start of an operation. In this position the ball members 84 engage the notches 86, and upon thrust by the operator in a right-hand direction in Fig. 9 the operating rod 79 will be pushed forwardly, carrying the valve 74 from the position shown in Fig. 9 to the position shown in Fig. 7, providing communication from the air chest 66 through the passage 73 into the cylinder 71. It is preferably arranged that the amount of stroke provided for the operating rod 79 is less than that permissible for the handle member 77, so that at the end of the operating stroke of the member 79 the handle 77 will be forced forwardly into engagement with the head 81 of the valve chest 66, forcing the balls 84 out of the notches 86, into the position illustrated in Fig. 16.

Means are provided for automatically returning the valve 74 to the position illustrated in Fig. 9, such means being indicated generally by the reference numeral 88 and comprising a cylinder 89 preferably mounted in the valve chest 66 at the forward end thereof and having a piston 90 provided with a piston rod 91 extending rearwardly toward the valve member 74 and adapted to engage the same within an opening 92, the piston rod 91 being preferably loosely fitted within the opening 92 and adapted to exert motive effort upon the valve 74 only in a left-hand or rearward direction. A passage is provided as at 93 from the cylinder 89 at the forward side of the piston 90, communicating with the space L' at the forward end of the motor cylinder 71. A stuffing box 95 is preferably provided for the piston rod 91, located in a removable head 96 and a rubber bumper or stop is preferably provided as at 97 to terminate the rearward stroke of the piston 90 in operation. A comparable bumper 98 is preferably provided in position to be engaged by the valve 74 in its rearward position, as shown in Fig. 9. Accumulation of pressure rearwardly of piston 90 is prevented by an atmospheric vent port 68.

The piston 69 is provided with cup leathers 99 facing in both forward and rearward directions, so as to be operative under pressure at either the forward or rearward face of the piston. Upon application of pressure through the passage 73 when the piston is at the rear end of cylinder 71, as in Fig. 7, the piston 69 will be moved forwardly or to the right, within the cylinder 71. As the piston 69 is moved forwardly, as to some such position as that shown in Fig. 9, the pressure within the space L' will be built up to a point such that the pressure communicated to the cylinder 89 and thus imposed upon the piston 90 will be sufficient to force the latter rearwardly (to the left) into the position illustrated in Fig. 9, moving the valve 74 to the position of Fig. 9 and causing the passage 73 to be sealed from the air chest 66 and connected to the exhaust passage 75. Under this condition, with the rearward end of the cylinder 71 connected to exhaust, the high pressure developed by the forward motion of the piston within the forward space L' will begin to decelerate the piston 69 and then force said piston rearwardly, returning it toward the rearward end of the cylinder 71. In order to provide a cushion effect at the rearward end of the cylinder 71 we preferably provide the piston 69 with a rearwardly projecting skirt 100 adapted to cooperate with a forwardly extending portion 101 on cylinder head 71A and enter an annular space 102 about the portion 101 when the piston is at its extreme rearward position. When the skirt 100 passes the passage 73 on the rearward stroke of the piston, the air or other fluid trapped within the space 102 becomes rapidly compressed by the continued motion of the piston 69, the resulting pressure build-up serving to bring the piston to a stop without striking the cylinder head. The skirt 100 will be provided with a minor clearance from the wall of the cylinder 71, in order that the air within the space 102 will not be completely trapped, but will pass the skirt slowly and be discharged through the passage 73. In initiating the forward stroke of the piston, the motive fluid supplied at 73 from the chest 66 will pass the skirt 100 in a sufficient quantity to force the piston 69 forwardly until the skirt 100 uncovers the passage 73, at which time the full force of motive fluid supply will be available for further movement of the piston.

Means are preferably provided for supply of air or other compressible fluid to the space L' forwardly of the piston 69, under a minor superatmospheric pressure, as through a pressure reducer such as illustrated at 103 in Fig. 7, said pressure reducer being of the type which reduces flow of fluid from the space L'. Alternatively, this desired supply of relatively low pressure air to the space L' may be provided by means of a restricted passage 104 (Figs. 9, 10 and 12) communicating between the interior of the valve chest 66 and the cylinder 89, whence the air supply for the space L' extends through passage 93 to the space L', in which event a bleed line 105 (Figs. 9 and 12) will be provided to relieve the excess pressure which will tend to build up within the space L' in view of the relatively high pressure of air supply within the chest 66. The low-pressure air supply provided for the space L' will cause the piston 69 to move slowly but surely to a rearward rest position in the completion of the rearward stroke, and to be retained in such position, and will provide a given volume and pressure of air in the forward end of cylinder 71 at the start of each forward stroke of the piston so as to insure stopping and reversal of piston movement at substantially the same position during successive cycles of operation.

One cycle of operation is completed when the piston 69 comes to its rearward rest position as shown in Fig. 7, in which condition the piston 90 may be considered to have the position shown in Fig. 9. As the pressure in the space L' (and consequently, in the cylinder 89) reduces to the relatively low superatmospheric pressure value established by the chest pressure, the size of passage 104 and the setting of bleed valve 105 (or by the pressure reducer 103 in Fig. 7), the chest pressure at 66 acting upon the rearward end of rod 91 will move the piston 90 to the position of Fig. 10. The valve rod 79, however, will remain in its maximum rearward position (shown in Figs. 9 and 17), and to prepare to initiate a second cycle of operation the operator pulls the operating lever 77 from the full line position to the dot-dash position (Fig. 9), causing the balls 84 to reengage with the notches 86 in the rod 79, as shown in Fig. 15. The device is then ready for its next cycle of operation.

As shown in Figs. 7, 9 and 11 the loose fitting yoke connection 83 between valve rod 79 and valve 74 is such as to permit easy adjustment of the position of valve 74 relative to rod 79. By substituting thinner bumper members, as at 98, and by increasing the length of piston rod 91 (or inserting spacers in opening 92 of valve 74 to accomplish the same purpose) the position of valve 74 relative to both passages or ports 73 and 75 may be adjusted. By so doing the extent of opening or uncovering of passage 73 by valve 74 when moved to its first or forward position (Fig. 7) to supply motive fluid from pressure chest 62 to cylinder 71 for the working stroke of piston 69 may be varied. Adjustment of the position of valve 74 may be made so that it will partly restrict exhaust port 75 when the valve is automatically shifted to its second or rearward position (Fig. 9) by the pressure built-up in space L' by piston 69 near the end of the working stroke, such built-up pressure acting through piston 90. Thus the operating characteristics of the forward as well as of the rearward working strokes of piston 69 may be modified for more efficient operation of the motor.

The form of apparatus shown in Figs. 18 and 19 comprises a cylinder 111 provided with a rearward closed end 112 and a piston 113 slidably disposed within the cylinder and carrying a piston rod 114 extending through a stuffing box 115 in the forward end 116 of the cylinder 111. A valve chest or chamber is provided as at 117, carrying a fluid pressure supply line 118. Within the valve chest 117 we provide valve means 119 adapted to expose a passage 120 in the rearward end of the cylinder 111 to the motive fluid pressure within the chest 117 in one position, and to connect said passage 120 to an exhaust passage 121 in another position. These two positions of the valve means 119 are illustrated in Figs. 19 and 18, respectively. Valve opening means 122 are provided, under control of an operating handle or push button 123, operative to move the valve actuating rod 124 in a direction such as to move the valve 119 from the position of Fig. 18 to the position of Fig. 19. Valve closing means 125 are also provided in operative association with the valve actuating rod 124, for movement of said rod and the associated valve 119 from the position shown in Fig. 19 to that shown in Fig. 18, the valve actuating rod 124 being engaged with the valve 119 as at 127.

For control of the valve opening means 122, the operating handle 113 is provided with a stem 129 extending through a stuffing box or packing 130 in the rearward head of the valve chamber 117, a biasing spring being provided as at 131 tending to hold the handle 123 and the stem 129 in a rearward or left-hand position (Fig. 18). The valve opening means 122 is provided with a ball valve 132 provided with a bias spring 132a tending to maintain the valve closed to normally prevent entrance of air from the chamber 117 through the passage 133 provided adjacent the ball 132. A valve lifter 134 is provided, in position to be engaged by the stem 129 in a forward position of the handle 123, to lift the valve 132 from its associated seat and permit fluid communication from the passage 133 through a passage 135 to a valve opening cylinder 136 which is disposed about the actuating rod 124. A packing 137 is provided at the head end of the cylinder 136, through which the rod 124 slidably extends, and a piston 138 slidably mounted within the cylinder 136 and upon the rod 124 is provided for actuation of the rod 124, said piston being provided with an axial cylindrical projection 139 of reduced cross-sectional area extending through a stuffing box 140 and provided at its forward end with a disengaging clutch 141 provided with detent balls 142 and bias springs 143 adapted to constrain said balls within a groove 144 in the rod 124. A rubber cushion is preferably provided as at 145 at the forward end of the cylinder 136, to act as a resilient stop for the piston 138. A bleed passage 146 is provided at the rearward end of the cylinder 132, and a vent passage 147 is provided at the forward end of the cylinder 136, the passages 146 and 147 preferably communicating to the atmosphere and the function of which will subsequently be described.

The valve closing means 125 may comprise a valve closing cylinder 148 provided with a piston 149 secured to the rod 124, the cylinder 148 being provided with a stuffing box 149a extending about the valve actuating rod 124 at the rearward end of the cylinder. A rubber stop member or other form of cushioning means is preferably provided as at 150, between the rearward face of the piston 149 and the rearward head 151 of the cylinder 148, which head 151 may conveniently be made removable. A vent passage 152 is provided adjacent the rearward end of cylinder 148, and a fluid passage 153 is provided at the forward end of cylinder 148, ahead of piston 149, which communicates with the space L'' at the forward end of the cylinder 111. Supply of air or other compressible gaseous fluid to the space ahead of the forward end of the piston 113 is preferably provided as through an air pressure supply line 155 connected to the forward end of the cylinder 111, and a drain cock 156 may be provided adjacent the rearward end of the cylinder 111 for periodical withdrawal of lubricating oil accumulation or the like. Air is supplied through line 155 at relatively low pressure similar to the air supplied through line 54 or pressure reduced 103 in the previously described forms of apparatus. For example, air at relatively low superatmospheric pressure may be supplied to line 155 through a pressure reducer in the same manner as shown at 103 in Fig. 7.

Operation of this latter form of the invention is as follows: When it is desired to secure a reciprocation cycle of the piston 113 within the cylinder 111, assuming the valve chest 117 to be supplied with suitable motive fluid under pressure as through passage 118, the operator pushes forwardly on the operating handle 123, overcoming the pressure of the spring 131 and the effective area pressure resulting on the forward end of the stem 129, pushing the valve lifter 134 forwardly into engagement with the ball valve 132, allowing pressure from the chamber 117 to enter passage 133 and pass through passage 135 to the cylinder 136. Upon supply of pressure to the cylinder 136, the piston 138 is moved forwardly (the vent passage 147 eliminating any back-pressure on the piston 138), the disengageable clutch means 141 causing the balls 142 to carry the actuating rod 124 forwardly, by engagement therewith at the groove 144. This operation moves the valve 119 and the piston 149 of the valve closing means 125 to the forward position shown in Fig. 19, opening the passage 120 to supply of motive fluid from the chamber 117 and causing the piston 113 to move forwardly or to the right. Under this forward movement of the piston the pressure in the space L'' ahead of the piston 113 will gradually increase, and when it has increased to a predetermined value which will be governed by the cross-sectional areas of cylinder 148, passage 153, and vent passage 152, the piston 149 will be forced rearwardly to the position shown in Fig. 18, carrying the valve 119 to the Fig. 18 position and connecting the passage 120 to the exhaust passage 121. The pressure built up in the space L'' will quickly stop and then reverse the piston 113, causing it to move rearwardly.

In the event that the operation of the piston 149 takes place while the operator still maintains pressure on the operating handle 123, which is the usual situation in view of the very rapid forward stroke of the piston 113 and its rod 114 when a relatively high pressure motive fluid supply is provided for the chamber 117, pressure will still be maintained within the cylinder 136, opposing a rearward movement of the piston 138 as the actuating rod 124 is moved rearwardly by the piston 149. Under this circumstance, the clutch balls 142 will release from the groove 144 in the rod 124 allowing the rod 124 to pass to its left-hand or rearward position without disturbing the position of the piston 138. The rearward stroke of the piston 113 is preferably cushioned at the end, as through the overhanging skirt construction and forwardly projecting cylinder head at the rearward end of the cylinder as described in connection with the form of the invention shown in Fig. 7, and so long as a slightly superatmospheric pressure is maintained in the space L'' as by supply through conduit 155, the piston 113 will be caused to move clear to its rearward position and be retained in this rearward position.

Upon release of the operating handle 123 by the operator, closing the supply of air or other gaseous motive fluid which had been provided to cylinder 136, the pressure within this cylinder will subside by virtue of the bleed passage 146 exhausting the cylinder to atmosphere. By virtue of the packing means provided at 140 about the axial projection 139 of the piston 138, the forward end of the projection 139 becomes a piston acted upon by the pressure within the chest 117, which causes the piston to be moved rearwardly or to the left-hand position shown in Fig. 18 upon subsidence of this pressure in cylinder 136, until the balls 142 engage with the groove 144 in the rod 124. The device is now in position for a repetition of the reciprocation cycle.

Referring now to all forms of the invention herein disclosed, it will be appreciated that the forward motion of piston 21, 69, or 113, under an operating pressure of say 100 lbs. per sq. in., starts out with but a nominal back pressure in the body of compressible fluid trapped ahead of the piston even where a low-pressure air supply is furnished to such space, and a rapid acceleration of the piston and operated member (say, the puncher rod F) results. Upon movement of the piston to the half-stroke position the pressure in the space L, L', or L'' ahead of the piston is still relatively low, reaching a value in the neighborhood of the rearward side or operating pressure only when the piston reaches about the three-quarter stroke position or somewhat beyond (as in Fig. 9). At about this position the maximum velocity of travel of the piston has been attained, and the kinetic energy of the moving system is high. The velocity of movement begins to decrease slightly at about this point and then decreases exceedingly rapidly as the stroke progresses past the seven-eighths point (as in Fig. 1), as a result of the absorption of the kinetic energy and increased back pressure. The pressure built up at the forward end of the cylinder (as in space L, L', or L'') may reach a value between one and two thousand pounds per square inch near the end of the stroke, and causes a rapid deceleration and then reversal of the moving system. For most instances, however, a built-up pressure of the order of 275 lbs. per square inch is sufficient for smooth and effective operation and the feeding and venting of the pressure fluid will be adjusted accordingly.

Near the end of the forward stroke valve 29, 74, or 119 is moved to "exhaust" position, and the very high pressure built up at the forward side of piston 21, 69, or 113, coupled with the sudden release of pressure at the rear side of the piston, quickly reverses the motion of the piston and returns it to its rearward position.

In a specific test, using 100 p. s. i. operating pressure and a 5 p. s. i. initial back pressure, a velocity of about 40 ft. per second was observed at a position only three-quarters of an inch from the end of the stroke (in an example where a 13 inch stroke is caused to take place in a 13½ inch free-travel cylinder) and a rearward velocity of about 26 ft. per second was observed at a position only one-half inch removed from the end of the stroke, the elapsed time between these positions being less than about 0.01 second.

In another test, with an operating pressure of 100 p. s. i. and an initial back pressure of 7 p. s. i., a maximum forward velocity of about 42 ft. per second was observed at about 2 inches from the forward end of the stroke and a maximum rearward velocity of about 34 ft. per second was attained within 2 inches from the position of reversal, the total elapsed time between these two positions being less than 0.02 second. In this case, the piston stroke was about 11½ inches in a cylinder providing for a maximum possible stroke of about 13 inches. In each of these tests the total elapsed time for the complete cycle of operation (forward working stroke and rearward return stroke of the working piston) was less than one-half (½) of a second.

Only a small proportion of the stored energy resulting from the pressure build-up in the body of fluid trapped in the front end of the cylinder 18, 71, or 111 is dissipated by the valve operation through the pressure-responsive valve control means, and this observed rapid and prompt attainment of a high velocity return stroke is indicative of a very efficient utilization of the energy stored up at the forward face of the piston during the forward stroke. Such operating characteristics are of particular advantage in converter-tuyere punching.

The nominal back pressure which is maintained in the space in front of piston 21, 69, or 113 insures that the piston will return to and stay in the rearward position, even if the cylinder axis were to be disposed at an appreciable angle to the vertical, as would occur where the converter of Fig. 2 or Fig. 7 is rotated clockwise for the purpose of charging material to, and removing slag, etc., from the converter.

In the motors or actuator devices of the present invention the supplied motive fluid (such as high-pressure air from the valve chest 26, 69, or 117) is supplied at high pressure to the main cylinder 18, 71, or 111 at only the rear side of the puncher actuating piston 21, 69, or 113, to effect only the forward movement of the piston and the puncher rod, and the motive fluid so supplied is substantially completely exhausted to the atmosphere through exhaust passage 39, 75, or 121 during the return or rearward movement of the piston and puncher rod to complete a rapid single cycle reciprocation of the puncher rod. The interior of the main cylinder forwardly of the working piston, however, is at all times in open communication with the forward end of the relatively small valve control cylinder 49, 89, or 148 through passage 51, 93, or 153 and substantially shut off from free communication with the source of high pressure motive fluid supply and from the atmosphere. Consequently air in the main cylinder forwardly of position 21, 69, or 113 is retained or trapped therein and compressed to a relatively high pressure during the forward stroke of the piston, and the air so compressed is utilized to stop the forward motion of the piston and then cause rapid return movement thereof.

Thus, the air compressed forwardly of the piston is utilized both to effect operation of the automatic valve control means for shutting off the rearward end of the cylinder from the high pressure air supply and connecting it to exhaust and also to effect the return movement of the piston. This latter feature distinguishes this motor or device from those in which a fluid medium is alternatively admitted under pressure to, and exhausted from each end of a cylinder to effect reciprocating movement of a piston as in the forms of reciprocating motor means shown for example in our above mentioned Patent No. 2,432,996.

As noted above, means are preferably provided for admitting some air at relatively low pressure to the main cylinder forwardly of the piston to maintain a nominal back pressure therein for purposes brought out above, as for example at 53 in Fig. 1, or at 103 in Fig. 7, or at 155 in Fig. 18; or by means of the restricted passage 104 leading from the valve chest in combination with the bleed line 105 for relieving excess pressure as shown in Figs. 9 and 12. However, the pressure of the air so admitted is very low compared to the pressure of the motive fluid supplied to the rear end of the cylinder during the forward stroke of the piston, as illustrated by the above specific examples using an operating pressure of 100 p. s. i. and a back pressure of only 5 or 7 p. s. i., and is so low as to be practically negligible in proportion to the pressure which is built up at the forward end of the cylinder during the forward stroke of the piston and utilized to effect the rearward stroke. Furthermore, even though some air may be allowed to escape from the forward end of the cylinder, as through the above mentioned restricted passage 53 in Fig. 1 or the bleed line 105 of Figs. 9 and 12, the passage for such escape of air is quite restricted so that only a very small proportion, generally less than 5 per cent, of the body of air forwardly of the piston at the start of the forward stroke is discharged from the cylinder during the entire forward and rearward stroke.

It will be appreciated that the cross-sectional area of the passages 51, 93, and 153 will necessarily affect the rate of pressure build-up in the cylinders 49, 89, and 148, and we preferably make this area as large as practicable in order that the pressure in the valve-control cylinder may follow the pressure in the main cylinder to as great an extent as is practicable, wherefore the response of the valve-closing means is a function of the pressure obtaining in the main cylinder. The forces opposing valve-closing movement of the piston 50, 90, or 149 consist essentially of the effective pressure areas of the valve-engaging members 44, 91, or 124 frictional opposition to movement of the valve 29, 74, or 119 and of the members that move therewith; and the pressure of the entrapped body of compressible fluid at the rearward face of the piston 50, 90, or 149. In view of these forces, the area of the cylinders 49, 89, and 148 will be so selected as to cause valve-closing movement of the pistons 50, 90, and 149 when a predetermined pressure has been attained in the cylinder spaces L, L' and L'' forward of the main pistons 21, 69 and 113. With consistent maintenance of a given pressure in the air chests 26, 66, and 117, this predetermined pressure in the cylinder spaces L, L' and L'' will be attained at a uniform forward position of the respective pistons 21, 69, and 113, assuming the nominal back-pressure maintained as at 53, 103, 104—105, or 155 is consistent. Increase in this nominal back pressure maintained in the forward end of the main cylinder 18, 71 or 111 has the effect of causing earlier initiation of the valve-closing movement, and a shortening of the operating stroke of the main piston and operated member, and increase in the valve-chest pressure has the effect of causing later initiation of the valve-closing movement as well as lengthening of the operating stroke. The rate of opening of the valve 29, 74, or 119 will also have an effect, and in either of the forms of invention shown in Figs. 1 and 7 a sluggish forward movement of the working piston will result if the operating lever is moved forward slowly. In the form of device shown in Figs. 18 and 19, the rate of operation is independent of the operator. Proper adjustment of the position of valve 29 or 74 relative to the cylinder passage or port 25 or 75 to establish the rate of speed and volume of motive fluid is essential to a working stroke of suitable velocity and force, and control of the venting of fluid from behind the piston is equally essential in attaining smooth operation and full efficiency for the motor.

In each of the above forms of device, the piston 21, 69, or 113 is prevented from bottoming upon the forward cylinder head by complete absorption of the kinetic energy of the moving system before the position of the cylinder head is reached. The control of the reversal position may be had, as above described, by adjustment of the length of the operating stroke, or by design of the pressure-responsive valve control means which operates in response to a given superatmospheric pressure condition at the forward end of the cylinder. The prevention of piston bottoming is essential to the consistent and continued operation of the device and has been uniformly attained with the structure of the present invention.

It will be appreciated that the motive fluid employed in the operation of the device of this invention will preferably be of a compressible nature, such as air or steam. The fluid pressure space at the forward end of the cylinder will in all cases be provided with a compressible (gaseous) fluid, of which air is the most convenient example, so that the required pressure build-up will be obtained as the piston moves along its forward stroke, with such pressure resulting as a function of the extent of forward travel of the piston.

Many modifications in the disclosed structures will occur to those skilled in the art, and we choose therefore to be limited to the scope of the subjoined claims rather than to the specific details herein described and shown in the drawings.

We claim:

1. A fluid pressure operated motor for producing a rapid single-cycle reciprocation of an actuated member, which comprises: a cylinder having rear and front cylinder heads; a piston slidably mounted in said cylinder for forward movement therein from a normal rest position adjacent the rear cylinder head and for return movement to said rest position, said piston defining a rear cylinder space behind the piston for receiving motive fluid and a front cylinder space in front of the piston for confining a body of compressible fluid; a piston rod attached to said piston and extending through the front cylinder head for connection to an actuated member; said cylinder being provided with a cylinder port adjacent the rear cylinder head communicating with said rear cylinder space at all positions of the piston; a source of motive fluid at relatively high superatmospheric pressure; a valve normally held in an exhaust position connecting said cylinder port to the atmosphere and movable between said exhaust position and a fluid supply position connecting said cylinder port to said motive fluid source; a first actuating member operable to move said valve from exhaust position to fluid supply position, to cause supply of motive fluid at relatively high pressure to the rear cylinder space and thereby effect rapid forward movement of the piston; said cylinder being provided with fluid confining means so restricting outflow of compressible fluid from the front cylinder space at all positions of the piston as to enable a superatmospheric pressure to be maintained in said front cylinder space when the piston is at any position, and to cause at least the major portion of the compressible fluid contained in the front cylinder space at the start of the forward movement of the piston to be retained and compressed therein during such forward movement; a second actuating member operable in response to fluid pressure in said front cylinder space to move said valve from fluid supply position to exhaust position when the pressure developed by such compression of fluid in said front cylinder space reaches a predetermined value, to thereby release motive fluid from the rear cylinder space and cause rapid return movement of the piston by the compressed fluid in the front cylinder space; and means communicating with the front cylinder space for supplying compressible fluid at relatively low superatmospheric pressure to said front cylinder space whenever the pressure therein falls below a certain value so as to insure complete return movement of the piston to its normal rest position and maintain a body of compressible fluid at relatively low superatmospheric pressure in said front cylinder space when the piston is in said rest position.

2. In a fluid pressure operated actuator device having a fluid pressure cylinder carrying a reciprocable piston provided with a piston rod extending through one end of the cylinder, and adapted for connection to an actuated member, said cylinder being provided with fluid passage means communicating with the interior thereof at its other end and having its one end substantially fluid-tight whereby a pressure build-up results at the forward face of said piston at said one end of said cylinder upon forward movement of said piston in response to pressure applied against the rearward face of said piston at said other end of said cylinder, a control means which comprises: valve means adapted in one position to connect said fluid passage means to a fluid pressure source and movable to another position to connect said fluid passage means to exhaust; manually controlled operating means associated with said valve means and adapted to cause movement of said valve means from said other position to said one position and a pressure-responsive element associated with said valve means and in fluid communication with said cylinder at said one end thereof, and adapted to return said valve means to said other position in response to a given superatmospheric pressure developed at the forward face of said piston, independent of the position of said manually controlled operating means; said manually controlled operating means including piston means, disengageable clutch means connecting said piston means to said valve means, cylinder means for said piston means provided with means defining a fluid passage adapted for communication with a fluid pressure source, a valve element in said fluid passage, and a manually operated member associated with said valve element whereby upon movement of said manually operated member in a given direction said valve element is caused to open said last mentioned fluid passage for supply of fluid pressure to said cylinder means, causing said piston means to move said valve means to said one position; and said pressure-responsive elements being adapted to move said valve means to said other position independent of the position of said piston means by causing disengagement of said clutch means.

3. In a fluid pressure operated actuator device having a fluid pressure cylinder carrying a reciprocable piston provided with a piston rod extending through one end of the cylinder, said cylinder being provided with fluid passage means communicating with the interior thereof at its other end and having its one end substantially fluid-tight whereby a pressure build-up results at the forward face of said piston at said one end of said fluid pressure cylinder upon forward movement of said piston in response to pressure applied against the rearward face of said piston at said other end of said cylinder, a control means which comprises: means defining a valve chest for said cylinder, said chest being adapted for connection to a source of fluid pressure; valve means in said chest adapted in one position to connect said fluid passage means to the interior of said valve chest and movable to and between said one position and another position connecting said fluid passage means to exhaust; manually operable means slidably mounted on said valve chest and having portions extending exteriorly and interiorly of said valve chest; a cylinder member within said valve chest, said cylinder member being provided with means defining a fluid passage adapted for communication with the interior of said chest; a valve element in said passage positioned for engagement by the interiorly disposed portion of said manually operable means and operable in response to movement of said means to cause supply of fluid pressure to said cylinder member; a piston member reciprocably mounted in said cylinder member; an actuating rod for said valve means; disengageable clutch means connecting said actuating rod to said piston member, said piston member being adapted for movement out of a normal rest position to a position placing said valve means in said one position upon supply of fluid pressure to said cylinder member in response to the opening of said valve element by said manually operable means; a second cylinder member in said valve chest; a piston element for said second cylinder member connected to said actuating rod, said second cylinder member being provided with means defining a fluid passage communicating with said fluid pressure cylinder adjacent said one end thereof, said piston element being adapted to move in response to said pressure build-up at said one end of said fluid pressure cylinder and effect movement of said actuating rod to move said valve means to said other position, causing disengagement of said clutch means in the event that said valve element remains open to continue pressure supply to the first-mentioned cylinder member.

4. A construction as set forth in claim 3, said piston member in said first mentioned cylinder member having a smaller area portion extending exteriorly of said first mentioned cylinder member and exposed to the pressure within said valve chest, whereby said piston member is caused to be returned to said normal rest position upon closing of said valve element in response to movement of said manually operable means to a normal position out of operative contact with said valve element, and comprising in addition, spring means biasing said manually operable means toward said normal position.

LEONARD LARSON.
BYRON T. BERGE.

REFERENCES CITED

The following references are of record in the file of this patent:

UNITED STATES PATENTS

| Number | Name | Date |
| --- | --- | --- |
| Re. 2,461 | James | Jan. 15, 1867 |
| 303,703 | Carricaburu | Aug. 19, 1884 |
| 357,345 | Smith | Feb. 8, 1887 |
| 1,494,030 | Slater | May 13, 1924 |
| 1,907,538 | Hanna | May 9, 1933 |
| 2,058,425 | Doyle | Oct. 27, 1936 |
| 2,168,711 | Kyle | Aug. 8, 1939 |
| 2,345,837 | Smith | Apr. 4, 1944 |
| 2,433,719 | Sittert | Dec. 30, 1947 |

FOREIGN PATENTS

| Number | Country | Date |
| --- | --- | --- |
| 389,318 | Great Britain | Mar. 16, 1933 |